United States Patent [19]

Shiraishi

[11] Patent Number: 5,054,530
[45] Date of Patent: Oct. 8, 1991

[54] PNEUMATIC TIRE HAVING A GROUNDING CENTERLINE OFFSET FROM A WIDTHWISE CENTERLINE

[75] Inventor: Akira Shiraishi, Chigasaki, Japan
[73] Assignee: The Yokohama Rubber Co., Ltd., Tokyo, Japan
[21] Appl. No.: 365,638
[22] Filed: Jun. 13, 1989
[30] Foreign Application Priority Data
Jun. 15, 1988 [JP] Japan .................................. 63-145825
[51] Int. Cl.$^5$ ............................................. B60C 11/08
[52] U.S. Cl. ............................. 152/209 A; 152/209 R
[58] Field of Search ........... 152/209 R, 290 D, 209 A
[56] References Cited
U.S. PATENT DOCUMENTS
3,286,756 11/1966 Ellenrieder et al. ............ 152/209 A
4,667,717 5/1987 Graas ................................ 152/209 D
4,732,194 3/1988 Saneto et al. .................... 152/209 R
4,785,863 11/1988 Tsuda et al. ..................... 152/209 A Primary Examiner—Geoffrey L. Knable
Attorney, Agent, or Firm—Armstrong, Nikaido, Marmelstein, Kubovcik & Murray

[57] ABSTRACT

A pneumatic tire which has its grounding surface formed with V-shaped grooves, each of which has its apex located on a grounding center line of a tire ground surface and its transverse branches inclined widthwise of the tire in the running direction of the tire. The average angle of the transverse branches made with the leading edge of the grounding surface, where the grounding surface is widthwise equidistantly divided into ten sections, is set absolutely constant or within an allowance.

5 Claims, 3 Drawing Sheets

Fig.1( A )
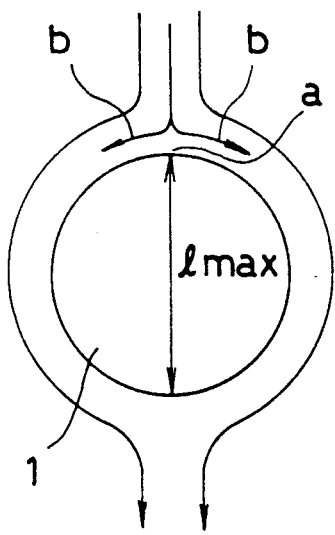
Fig.1( B )
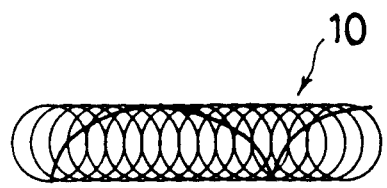
Fig.1( C )
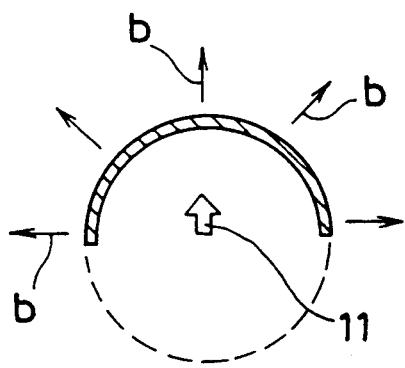
Fig.1( D )
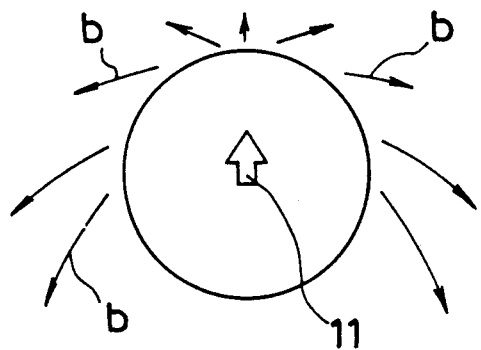

PNEUMATIC TIRE HAVING A GROUNDING CENTERLINE OFFSET FROM A WIDTHWISE CENTERLINE

BACKGROUND OF THE INVENTION

The present invention relates to a pneumatic tire having an excellent water-repellency.

A number of techniques of a tread pattern formed on the tread surface (i.e., ground-contacting surface) of the tire have been proposed in the prior art, in terms of the water-repellency, the steering stability and so on. However, none of them have satisfied water-repellency yet.

Generally speaking, it is natural to lay stress on the repellency of the tire if the running on a poorly drained road such as a superhighway is taken into consideration. Water-repelling grooves have to be provided on the tread surface by noting the grounding pattern taken when a vehicle runs on such road.

The posture of the tire relative to the road surface is determined according to the so-called "wheel alignment" such as the toe-in or the camber angle. Although these are fundamental, it is necessary for considering the water-repellency of the tire to note that the grounding pattern has its shape varied according to the wheel alignment when the tire is attached to the vehicle.

The arrangement of the water-repelling grooves made heretofore has been designed without paying attention to the above-specified wheel alignment so that the sufficient repellency cannot be achieved.

SUMMARY OF THE INVENTION

The present invention has been conceived by making use of the wheel alignment (usually having a toe-in of −3 to 3 mm and a camber angle of −0°50′ to 1°) when tires are attached to the vehicle. More specifically, the present invention contemplates to provide a pneumatic tire which has its grounding surface formed with a tread pattern having an excellent water-repellency when the vehicle runs on a superhighway. It is, therefore, an object of the present invention to provide a pneumatic tire which has a sufficiently excellent water-repellency.

In order to achieve this object, the gist of the present invention resides in a pneumatic tire having its grounding surface formed with V-shaped grooves, each of which has its apex located on grounding center line of a tire ground surface and its transverse branches inclined widthwise of the tire in the running direction of the tire, wherein the average angle of the transverse branches made with the leading edge of the grounding surface at the individual eight ones of ten widthwise equidistantly divided sections of the ground surface excepting the two side sections is constant absolutely or within an allowance.

Here, the "grounding center line" means the circumferential line on which the circumferential length of a tire takes its maximum in the grounding surface. On the other hand, the "average angle" means the angle which is averaged from the angles at three points of the widthwise center and both sides with respect to the individual sections.

BRIEF DESCRIPTION OF THE DRAWINGS

FIGS. 1 (A) to 1 (D) are explanatory views showing the relations between a tire placed on a road, along which rain water flows, and the water stream;

DESCRIPTION OF THE PREFERRED EMBODIMENTS

Figure 2:
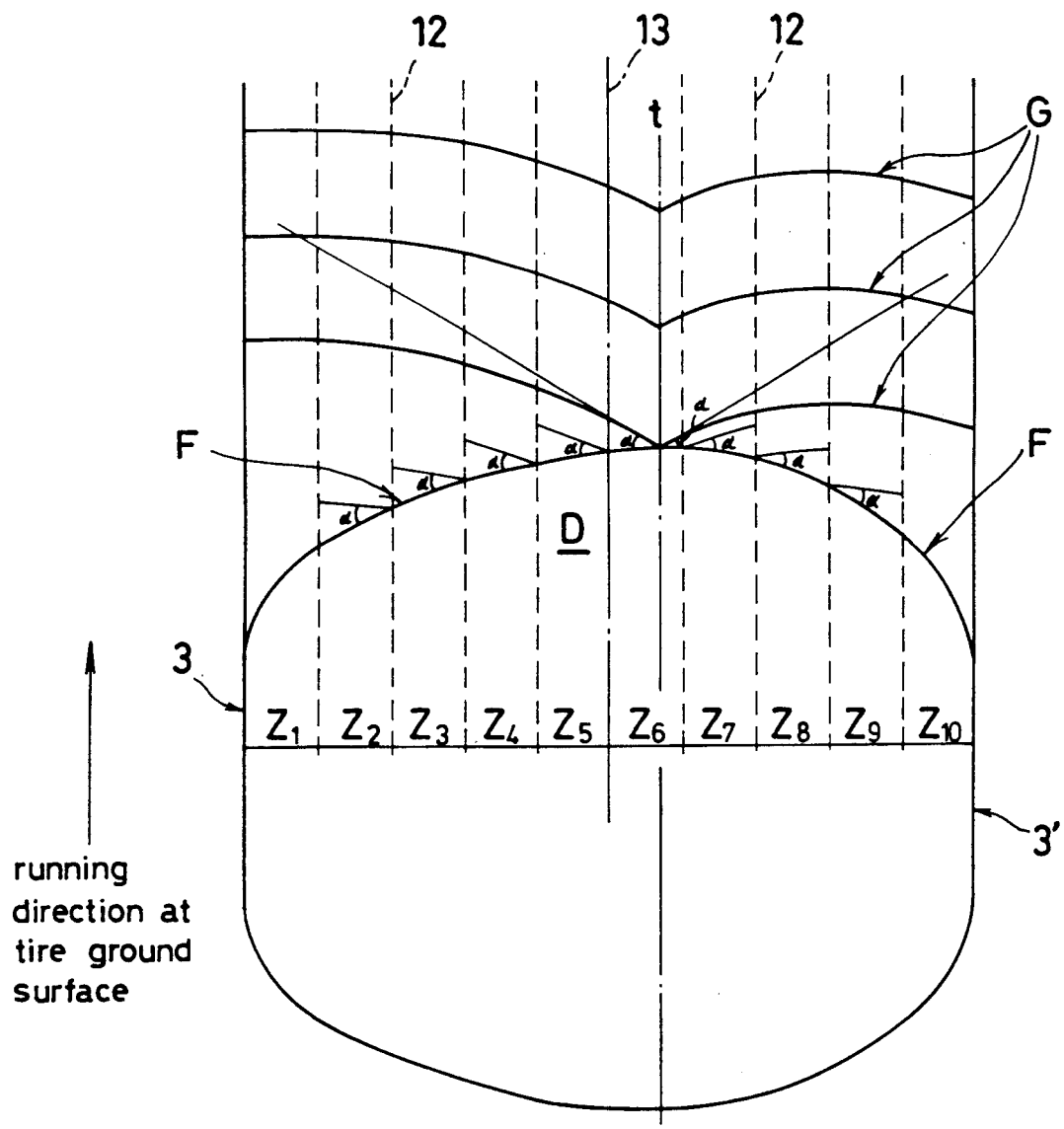
FIG. 2 is a partially enlarged schematic view showing the relation between the grounding surface and the groove pattern of the tire according to the present invention.

Since, generally speaking, the tire is given the wheel alignment when it is attached to a vehicle, as has been described hereinbefore, the location of the grounding center line is slightly offset from the widthwise center line of the tire even while the vehicle is running straight. On the other hand, the apexes of the aforementioned V-shaped grooves offer the most effective water repellency if they are positioned on the grounding center line. This makes it necessary to offset the apexes of the V-shaped grooves slightly from the widthwise center line of the tire.

On the other hand, our repeated experiments have confirmed that the displacement of the grounding center line from the widthwise center line of the tire given the ordinary wheel alignment is within one fifth of the grounding width.

The present invention has been conceived on the basis of the above-specified confirmation by setting at a constant value $\alpha$ the average angle made between the inclined grooves (or transverse branches), which extend with widthwise inclinations in the running direction of the tire across the grounding center line, and the leading edge of the grounding surface at the individual eight ones of ten widthwise equidistantly divided sections of the grounding surface excepting the two side sections. As has been described hereinbefore, moreover, the constant angle $\alpha$ is set within a range of 15° to 45° (i.e., 30°±15°), preferably a range of 25° to 35°, although varying with the wheel alignment. Under 15°, the running time period from the start to the end of the grounding of the transverse grooves is too short for the water to steal out smoothly through the transverse grooves so that the water-repellency is dropped. Over 45°, on the contrary, the time period from the start to the end of the grounding of the transverse grooves is so long that the water flowing in the transverse grooves is confined for a long time, thus dropping the water-repellency. On the other hand, it is most preferable that the angles at the individual eight sections be a constant value $\alpha$. Despite of this preference, however, our repeated experiments have confirmed that the angles can retain the water-repellency even if they fluctuate within a range of ±5° (preferably ±3°).

In the two side sections of the grounding surface divided widthwise into the ten sections, on the other hand, it is practically preferable from the standpoint of the steering stability during the cornering or the prevention of partial wear at the shoulder of the tire to attempt to maintain the circumferential rigidity of the shoulder. It is, therefore, recommended that the transverse grooves in those sections should contain the portions with 70° to 110° at least the two side sections (or shoulder) of the grounding surface with respect to the circumference of the tire.

The present invention will be described in detail in connection with its structure with reference to the accompanying drawings.

In case a cylinder is placed at a right angle with respect to the flow of a fluid or on a road surface, along which rain water flows, for example, as shown in FIG.

1 (A), the water is shunted, as indicated by arrows b in the vicinity a (which takes the maximum grounding length $l_{max}$) of the leading end of the grounding surface of the cylinder 1. In the grounding surface of the running tire, too, relative streams will occur like the case of the cylinder 1. On the other hand, a certain point (e.g., the edge of a block) of the tire moves while drawing a cycloid 10, as shown in FIG. 1 (B), if the tire is viewed from the side, so that the point abuts against the road surface at a right angle at its grounding instant. As a result, the grounding leading edge splashes the water radially outwardly, as indicated by the arrows b in FIG. 1 (C). In the actual tire, those splashes are combined to establish relative streams, as indicated by the arrows b in FIG. 1 (D). Here, arrow 11 designates the running direction of the tire.

Taking these points into consideration, therefore, it has been found that the intersection angle $\alpha$ made between transverse grooves G and the leading edge F of the grounding surface in the running direction be constant on the basis of the fundamental concept of the rugged (transverse) grooves for releasing the water from the grounding surface as smoothly as possible and for the shortest time. As a result, the rate and direction of the water flowing through the transverse grooves G are gently varied without energy loss so that the water-repellency is improved. Here, letter t designates the grounding center line.

FIG. 2 is a partially enlarged schematic view showing the relations between the grounding surface and the groove pattern of a pneumatic tire according to the present invention so as to explain the groove pattern. The transverse grooves of the tire of the present invention divide the grounding surface D of the tire widthwise equidistantly into ten sections ($Z_1$, $Z_2$, ..., and $Z_{10}$). Those transverse grooves G are formed into continuous ones such that the angles made with the leading edge F of the grounding surface across the grounding center line t and at the side of the center line t takes the value $\alpha$. Dotted lines 12 designate lines of division.

Here, it is most preferable that the transverse grooves G be formed in the form of curved ones making the constant angle $\alpha$ with respect to the leading edge F of the grounding surface. As a matter of fact, however, the angle of the transverse grooves G with the leading edge F may vary within a small range, the average angle $\beta$ (although not shown) of the individual sections for the inclined grooves in the common direction may be substantially set at the constant angle $\alpha$. In this case, the above-specified average angle $\beta$ at each section is allowed to vary within a range of ±5° (preferably ±3°) with respect to the constant angle $\alpha$.

Likewise, in the section $Z_6$ containing the grounding center line t, the average angles made between the transverse grooves G inclined transversely in the running direction across the center line t and the leading edge F of the grounding surface can be made different at the righthand and lefthand sides. In this case, it is necessary to set the difference between the righthand and lefthand angles within 5°. By this setting, too, it is possible to provide a tire which has an excellent water-repellency without any trouble in repelling the water on the road effectively through the transverse grooves G to the two sides of the running tire.

Although no circumferential groove is formed in the tread, as shown in FIG. 2, the water repelling effect can be augmented by adding the circumferential grooves to the groove pattern of FIG. 2.

Considering the steering stability during the cornering and the prevention of the partial wear of the tire shoulder, it is preferable that at least the portions of the transverse grooves G, which are open to the two sides 3 and 3' (i.e., the two shoulders) at the sections $Z_1$ and $Z_{10}$ form angles of 70° to 110° with respect to the circumferential direction of the tire without considering the relations to the leading edge F. Under 70°, the block rigidity is insufficient to lower the steering stability of the tire, and the block deformation is large to cause the partial wear inevitably, in case a large load is exerted during the cornering. Over 110°, similar phenomena will occur.

Figure 3:
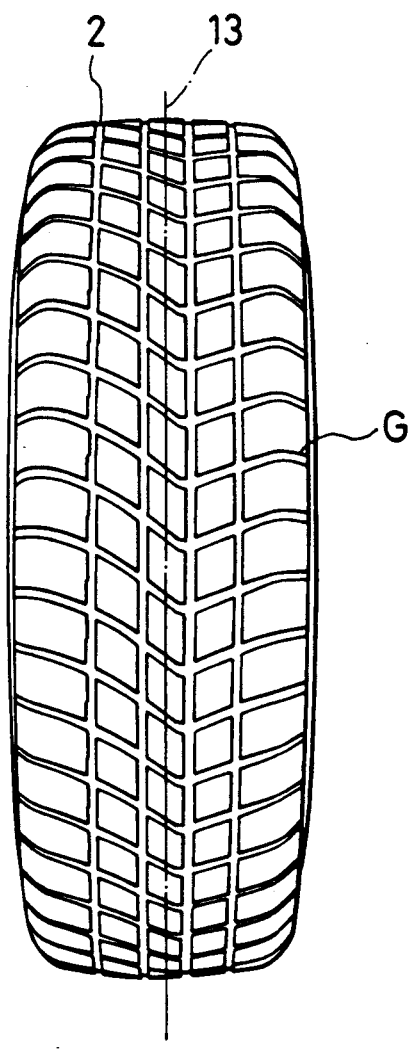
FIG. 3 is a front elevation showing the tire according to one embodiment of the present invention.

FIG. 3 is a front elevation showing a tire according to one embodiment of the present invention. In this embodiment, the tire is formed with not only the transverse grooves G inclined widthwise of the tire but also four main grooves 2 extending in the circumferential direction. Reference numeral 13 designates a circumferential line which is positioned at the widthwise center line of the tire on the grounding surface.

The present invention will be further described in the following in connection with its Example.

EXAMPLE

A smooth tire (Size: 185/60R14) having no tread pattern was prepared and inflated with air to have a regular internal pressure (1.9 Kg/cm$^2$). A normal load (410 Kg) was exerted upon the tire to confirm that the shape of the leading edge of the grounding surface of the tire. The grounding center line of the grounding surface was offset by 8 mm from the widthwise center line to one side.

Here, the tire was attached to the vehicle with a toe-in of 1 mm and a camber angle of $-10'$, but this wheel alignment should not limit the scope of the claim of the present invention.

TIRE OF THE INVENTION

The grounding surface of this smooth tire was widthwise divided into ten sections and was drawn with circumferential dividing lines and the grounding center line. The grounding surface was further drawn on the tread with predetermined leading edges at a circumferential pitch of about 30 mm. Lines were drawn at the individual sections excepting the two sides ones $Z_1$ and $Z_{10}$ from the individual points of intersection of the dividing lines, the grounding center line and the leading edge to the tire sides in the running direction of the tire at an angle of 30° to the leading edge line of the grounding surface, and other lines were drawn in the two side sections $Z_1$ and $Z_{10}$ at an angle of 90° with respect to the circumferential direction of the tire. Thus, the positions of the transverse grooves were determined at the righthand and lefthand sides across the grounding center line. In these ways, the lines for the transverse grooves were drawn on the tread pattern. Then, the positions of the circumferential grooves were determined at 15 mm and 40 mm from the grounding center line at the two sides of the center line, and the lines for the circumferential grooves were then drawn on the tread surface.

After this, the transverse grooves and the circumferential grooves were cut with a width of 7 mm and a depth of 6 mm to form the tread pattern.

TIRE OF THE PRIOR ART

The tire of the prior art was prepared with the same groove area ratio, groove pitch and groove depth as those of the tire of the present invention. This tire was cut to form in its tread surface: transverse grooves of straight shape having an angle of 30° on the grounding center line with respect to its circumferential direction in the running direction of the tire: and circumferential grooves in the same positions as those of the tire of the present invention, thus completing the tread pattern.

The tires of these two types are evaluated as to the occurrence of the hydroplaning phenomena and the runability on a wet circuit according to the testing items, as will be described hereinafter. The test results are enumerated in Table 1.

METHOD OF EVALUATING THE HYDROPLANING PHENOMENA

The speed, at which the hydroplaning phenomena would occur, was evaluated when the tire passes the road having a water depth of 5 mm. The results are tabulated in index. The larger value is the more preferable.

METHOD OF EVALUATING THE WET-CIRCUIT RUNABILITY

The lap time was measured in rain on the circuit road (which was crossed at several positions by streams having a depth of about 3 mm). The results are also tabulated in index. The larger value is also the more preferable.

TABLE 1

|  | Tire (Invention) | Tire (Prior Art) |
|---|---|---|
| Hydroplaning | 107 | 100 |
| Runability | 102 | 100 |

From Table 1, it can be concluded that the tire of the present invention is superior in the water-repellency to the tire of the prior art.

As has been described hereinbefore, according to the present invention, the angles, at which the water-repelling grooves are arranged in the grounding surface of the tire, are set with a constant range with respect to the leading edge of the grounding surface of the tire. As a result, the water-repellency can be improved to make the best use of the water flows around and in the grounding surface of the tire, in case the tire runs on a pool, thus enhancing the water-repelling efficiency. Thus, the grounding property of the tire can be improved. By improving the groove pattern at the shoulder of the tire, moreover, it is further possible to improve the steering stability during the cornering and the partial wear of the shoulder.

What is claimed is:

1. A pneumatic tire having a tread with a grounding surface when inflated to regular internal pressure and under a normal load and a grounding center line extending in a circumferential direction of said tire tread across a maximum circumferential length of said grounding surface, said grounding surface being formed with V-shaped grooves, each of which has an apex located on said grounding center line of said tire grounding surface and transverse branches extending across the full width of said grounding surface and inclined widthwise of said tire in the forward direction of movement of a footprint of said tire, said grounding center line being offset from a widthwise center line of said tire wherein the average angle of the angles of said transverse branches made with a leading edge of said grounding surface within each of eight of ten widthwise equidistantly divided sections of said grounding surface excepting the two side sections is set at an angle with 5° of a constant angle $\alpha$.

2. A pneumatic tire according to claim 1, wherein the constant angle $\alpha$ is an angle within a range of 15°–45°.

3. A pneumatic tire according to claim 1, wherein the grounding center line of said grounding surface is offset up to one fifth of the grounding width of the tire from the widthwise center line of said tire.

4. A pneumatic tire according to claim 1, wherein the average angles made in the section containing said grounding center line between the transverse grooves inclined transversely in the forward direction of movement of a footprint of said tire across said grounding center line and the leading edge of said grounding surface are different at the right and left sides of said grounding center line and the difference is less than 5°.

5. A pneumatic tire according to claim 1, wherein the angles of said transverse grooves in at least the portions of the two side edges of said grounding surface in the two widthwise side sections of said grounding surface, where the grounding surface is widthwise equidistantly divided into ten sections, are set within a range of 70° to 110° with respect to the circumferential direction of said tire.

* * * * *